United States Patent
Morris et al.

(10) Patent No.: US 6,744,589 B2
(45) Date of Patent: Jun. 1, 2004

(54) SINGLE-SIDED UNIPOLAR DEVICE DRIVER FOR A PIEZOELECTRIC TRANSDUCER IN A DISC DRIVE

(75) Inventors: John C. Morris, Minneapolis, MN (US); Reed D. Hanson, Chaska, MN (US)

(73) Assignee: Seagate Technology LLC, Scotts Valley, CA (US)

(*) Notice: Subject to any disclaimer, the term of this patent is extended or adjusted under 35 U.S.C. 154(b) by 375 days.

(21) Appl. No.: 09/847,758

(22) Filed: May 2, 2001

(65) Prior Publication Data

US 2001/0036035 A1 Nov. 1, 2001

Related U.S. Application Data

(60) Provisional application No. 60/202,885, filed on May 10, 2000.

(51) Int. Cl.$^7$ ................................................. G11B 5/596
(52) U.S. Cl. ................................. 360/78.05; 360/77.02; 360/78.04
(58) Field of Search .......................... 360/78.05, 78.02, 360/78.04

(56) References Cited

U.S. PATENT DOCUMENTS

| | | | |
|---|---|---|---|
| 5,657,188 A | | 8/1997 | Jurgenson et al. |
| 5,674,027 A | | 10/1997 | Warnaar |
| 5,943,189 A | | 8/1999 | Boutaghou et al. |
| 6,005,742 A | * | 12/1999 | Cunningham et al. ... 360/78.05 |
| 6,025,975 A | | 2/2000 | Fard et al. |
| 6,052,251 A | | 4/2000 | Mohajerani et al. |
| 6,064,550 A | | 5/2000 | Koganezawa |
| 6,069,771 A | | 5/2000 | Boutaghou et al. |
| 6,134,087 A | | 10/2000 | Khan et al. |
| 6,157,510 A | | 12/2000 | Schreck et al. |
| 6,157,522 A | | 12/2000 | Murphy et al. |
| 6,437,937 B1 | * | 8/2002 | Guo et al. ................ 360/78.05 |

* cited by examiner

Primary Examiner—David Hudspeth
Assistant Examiner—Mitchell Slavitt
(74) Attorney, Agent, or Firm—Fellers, Snider, et al.

(57) ABSTRACT

A disc drive including a rotatable data track, a dual-stage actuator with a primary actuator motor supporting an actuator arm, a read/write head supported by the actuator arm and communicating with a secondary actuator motor, and steps for controlling range of motion of the secondary actuator motor. The controlling steps include supplying and sustaining a bias signal to a single-sided unipolar device driver that then apply a bias voltage the secondary actuator motor to induce the secondary actuator motor to expand substantially one half of its expansion capabilities. And, confining correction signals provided by a control circuit of the disc drive, used in correcting mechanical position of the secondary actuator motor, to a voltage ranging substantially between a positive "+" and negative "−" voltage substantially equal to the applied bias voltage.

17 Claims, 3 Drawing Sheets

SINGLE-SIDED UNIPOLAR DEVICE DRIVER FOR A PIEZOELECTRIC TRANSDUCER IN A DISC DRIVE

RELATED APPLICATIONS

This application claims priority to U.S. Provisional Application No. 60/202,885 filed May 10, 2000, entitled Single-Sided PZT Driver in Disc Drive.

FIELD OF THE INVENTION

This invention relates generally to the field of magnetic data storage devices, and more particularly, but not by way of limitation, to incorporation of a single-sided unipolar piezoelectric transducer driver for a disc drive.

BACKGROUND

Disc drives are used for data storage in modem electronic products ranging from digital cameras to computer systems and networks. Typically, a disc drive includes a mechanical portion, or head disc assembly (HDA), and electronics in the form of a printed circuit board assembly (PCB), mounted to an outer surface of the HDA. The PCB controls HDA functions and provides an interface between the disc drive and its host.

Typically, a HDA comprises a magnetic disc surface affixed to a spindle motor assembly for rotation at a constant speed and an actuator assembly position-controlled by a closed loop servo system. The actuator assembly supports a read/write head that traverses generally concentric magnetic tracks radially spaced across the disc surfaces. Disc drives using magneto resistive heads typically use an inductive element to write data to the tracks in the form of magnetic flux transitions and a magneto resistive element to read data, such as servo data, from the track during drive operations. Servo data are typically written to the track during the manufacturing process by a servo track writer and are used by the closed loop servo system for controlling read/write head position during drive operations.

Continued demand for disc drives with ever-increasing levels of data storage Continued demand for disc drives with ever-increasing levels of data storage capacity, faster data throughput and decreasing price per megabyte have led disc drive manufacturers to seek ways to increase the storage capacity and improve overall operating efficiencies of the disc drive. Present generation disc drives typically achieve areal densities of several gigabits per square centimeter, Gbits/cm$^2$. Increasing recording densities can be achieved by increasing the number of bits stored along each track or bits per inch (BPI), generally requiring improvements in the read/write channel electronics, and/or by increasing the number of tracks per unit width or tracks per inch (TPI), generally requiring improvements in servo control systems.

One approach taken by disc drive manufacturers to improve servo control systems has been through the introduction of dual-stage actuator systems. One such system utilizes a suspension based bipolar piezoelectric transducer (PZT) operating in parallel with the VCM and driven by a bipolar driver. To date, attempts at utilizing more cost-effective single-sided unipolar drivers in a dual-stage actuator application have been unsuccessful since the D.C. component of the position signal and the D.C. component of the PZT driver affects both the VCM and the PZT transducer control signals.

As such, challenges remain and a need persists for advancing dual-stage actuator art with economical and effective solutions that overcome the constraints present in disc drives with dual-stage actuator systems.

SUMMARY OF THE INVENTION

The present invention provides an economical method for position-controlling a mechanical position of a micro-actuator of a disc drive, through use of a single-sided unipolar device driver. By supplying a bias voltage to the micro-actuator, rather than as an offset to a reference signal, to preset the mechanical position of the micro-actuator relative to a selected data track of the disc drive, the single-sided unipolar device driver can be used to adjust the position of the micro-actuator, in either a positive or negative position, relative to the preset position, through use of a single polarity input voltage.

In a preferred embodiment the micro-actuator is a bipolar piezoelectric transducer that responds to positive voltage input by expanding in a predetermined direction, while contracting in response to the application of a negative voltage. The bias voltage supplied to the piezoelectric transducer is a positive voltage that expands the piezoelectric transducer by substantially one half of the expansion capabilities of the piezoelectric transducer. Correction signals generated by the control circuit of the disc drive are effective in changing the mechanical position of the micro-actuator relative to a selected data track when the correction signal has a voltage in the range of between a positive "+" or a negative "−" voltage substantially equal to the applied bias voltage. Correction signals of negative voltage reduce the voltage supplied to the micro-actuator, thereby causing the piezo electric transducer to contract. Whereas correction signals of positive voltage increase the voltage supplied to the micro-actuator, thereby causing the piezoelectric transducer to expand.

By confining the correction signals to a voltage range between a positive "+" or negative "−" voltage substantially equal to the applied bias voltage, a single-sided unipolar driver is effective in controlling the bipolar piezoelectric transducer. And, as the piezoelectric transducer is affixed to the load arm of the head stack assembly, changes in mechanical position of the micro-actuator relative to the selected data track results in changes in mechanical position of the read/write head relative to the selected data track, thereby facilitating position-control of the read/write head relative to the selected data track.

These and various other features and advantages, which characterize the present invention, will be apparent from a reading of the following detailed description and a review of the associated drawings.

DETAILED DESCRIPTION

Figure 1:
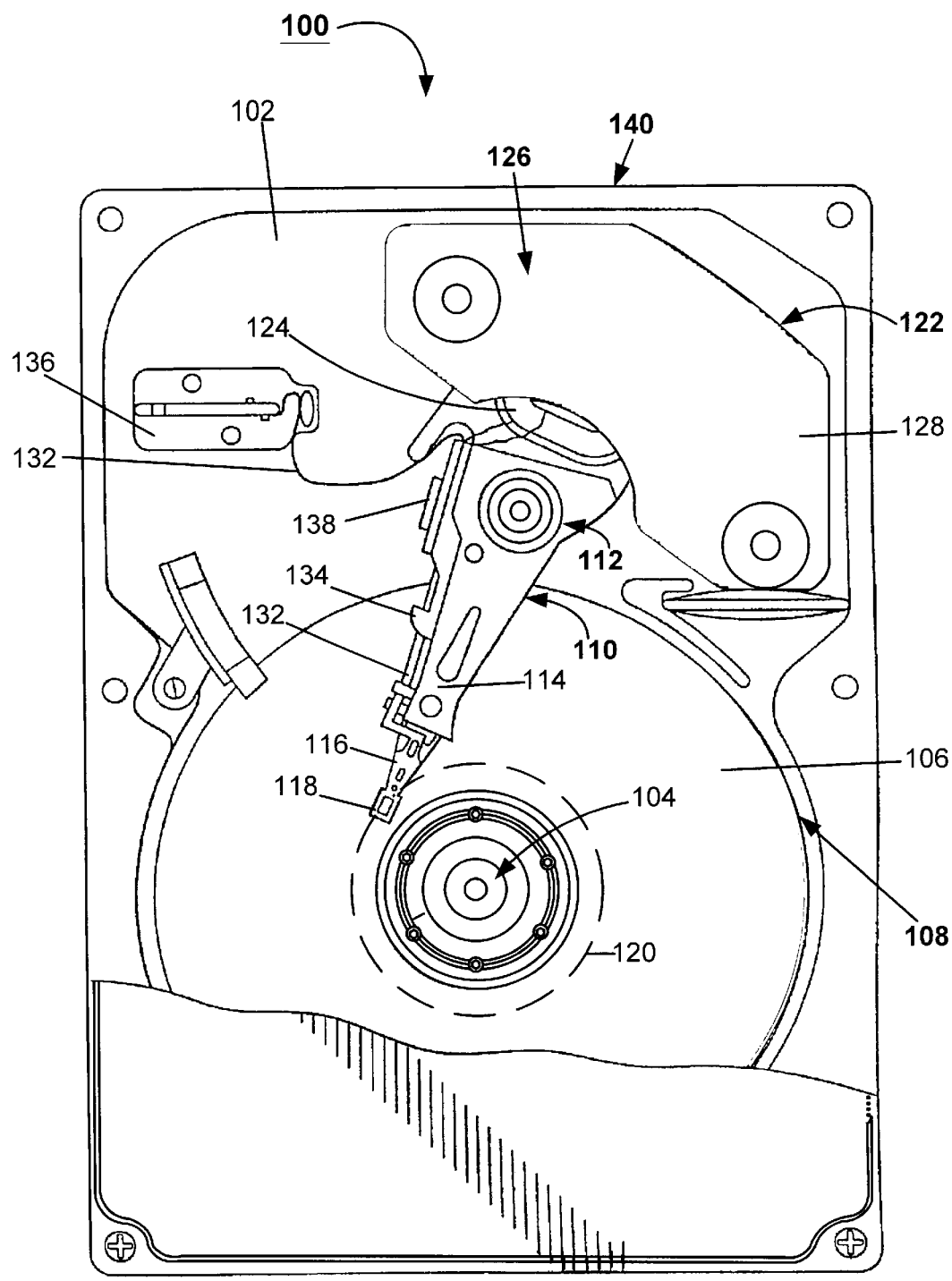
FIG. 1 is a top plan view of a disc drive incorporating a single-sided unipolar driver for driving a micro-actuator of the disc drive in accordance with a method of the present invention.

Referring to the drawings in general, and more particularly to FIG. 1, shown therein is a top view of a disc drive 100 constructed in accordance with the present invention. Numerous details of and variations for the construction of the disc drive 100 are not included in the following description as such are well-known to those skilled in the art and are believed to be unnecessary for the purpose of describing the present invention.

The disc drive 100 includes a basedeck 102 supporting various disc drive components, including a spindle motor assembly 104. The spindle motor assembly 104 supports at least one axially aligned rotatable disc surface 106 forming a disc stack 108 (also referred to as a "disc pack"). Adjacent the disc stack 108 is a dual-stage actuator assembly 110 (also referred to as an "E-block" or a head stack assembly (HSA)), which pivots about a primary actuator motor support 112 (also referred to as a "bearing assembly") in a rotary fashion. The HSA 110 includes at least one actuator arm 114 that supports a load arm 116. Each load arm 116 in turn supports at least one read/write head 118 (also referred as heads 118) that correspond to each disc surface 106. Each disc surface 106 is divided into concentric circular data tracks 120 (only one shown) over which the read/write heads 118 are positionably located, and on which head position control information are written to embedded servo sectors (not separately shown). The embedded servo sectors separate a plurality of data sectors (not separately shown) for use by customers to store data.

The HSA 110 is controllably positioned by a primary actuator motor 122 (also referred to as a "voice coil motor assembly" (VCM)), comprising an actuator coil 124 immersed in the magnetic field generated by a magnet assembly 126. A magnetically permeable flux path is provided by a steel plate 128 (also called a top pole piece) mounted above the actuator coil 124 to complete the magnetic circuit of the VCM 122. During operation of the disc drive 100, current is passed through the actuator coil 124 and an electromagnetic field is setup which interacts with the magnetic circuit of the VCM 122 to cause the actuator coil 124 to move relative to the magnet assembly 126 in accordance with the well-known Lorentz relationship. As the actuator coil 124 moves, the HSA 110 pivots about the bearing assembly 112 (also referred to as a primary actuator motor support), causing the heads 118 to move over the surfaces of the discs 106, thereby achieving a coarse positioning of the heads 118 adjacent a selected data track 120 of the disc surfaces 106.

To attain fine position control of the heads 118 relative to the selected data track 120, the HSA 110 further includes a micro-actuator 130 (also referred to as a secondary actuator motor) supported by the load arm 116. In a preferred embodiment the micro-actuator 130 includes a bipolar piezoelectric transducer (not separately shown) that responds to positive voltage inputs by expanding in a predetermined direction, while contracting in the predetermined direction to application of a negative voltage. As the micro-actuator 130 is affixed to the load arm 116 of the HSA 110, changes in mechanical position of the micro-actuator 130 relative to the selected data track 120 results in changes in mechanical position of the read/write head 118 relative to the selected data track 120, thereby facilitating fine position control of the read/write head 118 relative to the selected data track 120.

To provide the requisite electrical conduction paths between the read/write heads 118 and disc drive read/write circuitry (not shown), read/write head conductors (not separately shown) are affixed to a read/write flex circuit 132. Next, the read/write flex circuit 132 is routed from the load arms 116 along the actuator arms 114 and into a flex circuit containment channel 134, then on to a flex connector body 136. The flex connector body 136 supports the flex circuit 132 during passage of the read/write flex circuit 132 through the basedeck 102 and into electrical communication a disc drive printed circuit board assembly (PCBA) (not shown) mounted to the underside of the basedeck 102. The flex circuit containment channel 134 also supports read/write signal circuitry, including preamplifier/driver (preamp) 138 used to condition read/write signals passed between the read/write circuitry (not shown) and the read/write heads 118. The PCBA of the disc drive supports read/write circuitry, which controls the operation of the heads 118, as well as other interface and control circuitry for the disc drive 100. It will be understood, data drivers can be alternatively configured to output analog control signals to the VCM 122 and the micro-actuator 130 in response to digital input values.

The disc drive 100 has two primary assemblies, the PCBA (not shown) and a head disc assembly (HDA) 140 attached to the PCBA. Typically, included within the HDA 140 are the HSA 110, the VCM 122 and the disc pack 108.

Figure 2:
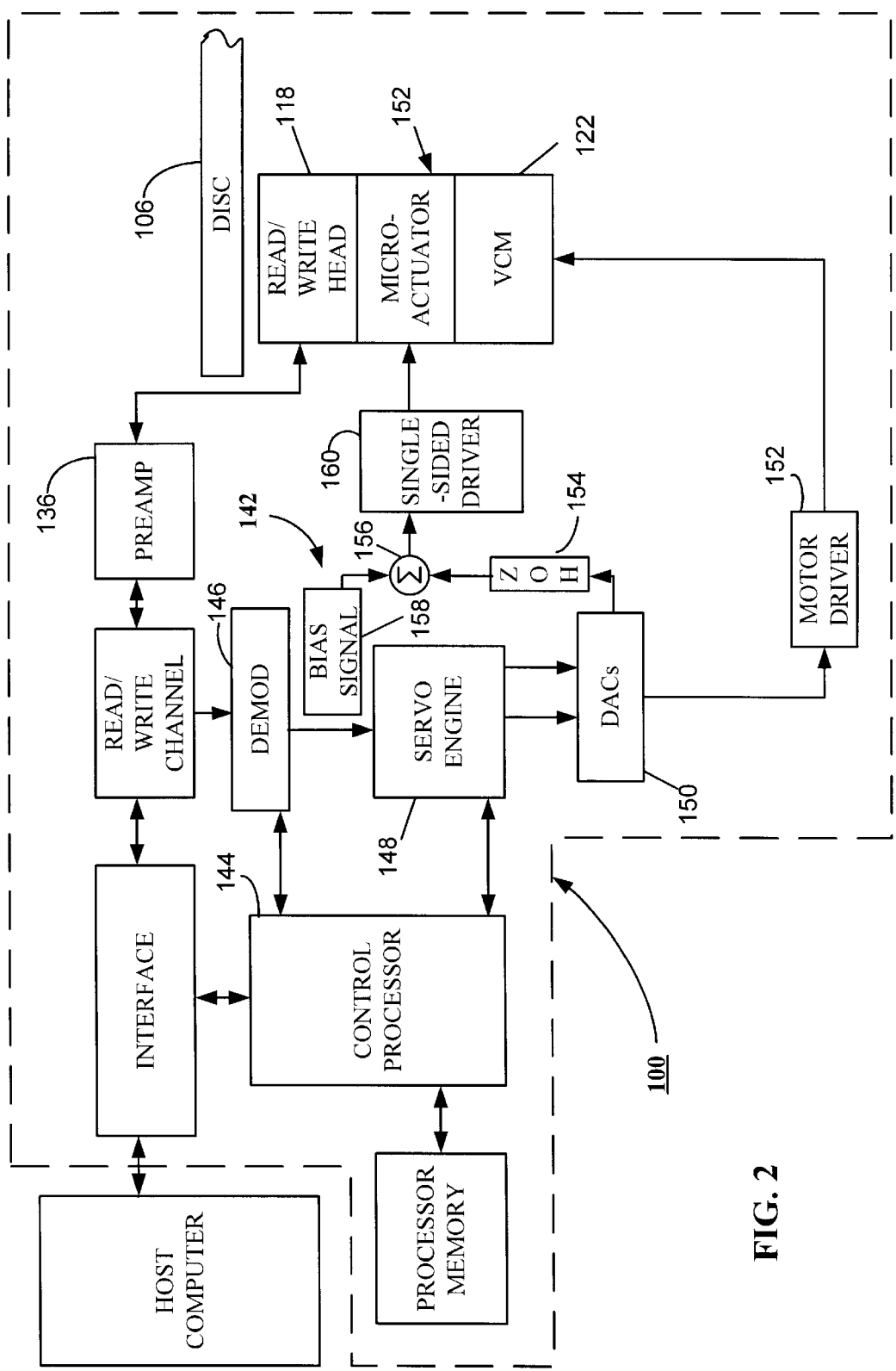
FIG. 2 is a functional block diagram of control circuitry of the disc drive of FIG. 1.

Turning to FIG. 2, position-control of the heads 118 is provided by a control circuit 142 that includes the control processor 144, a demodulator (demod) 146, an application specific integrated circuit (ASIC) hardware-based servo controller ("servo engine") 148, a set of digital to analog converters (DACs) 150 and a motor driver circuit 152. The components of the control circuit 142 discussed to this point are utilized to facilitate track following algorithms for the HSA 110 (not shown) and more specifically for controlling the VCM 122 in attaining a coarse positioning of the heads 118 relative to the selected data track 120 (not shown).

The demodulator 146 conditions head position control information transduced from the disc surface 106 to provide position information of the read/write head 118 relative to the data track 120. The servo engine 148 generates servo control loop values used by control processor 144 in generating command signals such as velocity-based seek signals used by VCM 122 in executing seek commands, and to maintain position of the HSA 110 during data transfer operations. The command signals are converted by the DACs 150 to analog control signals for use by the motor driver circuit 152 in directing coarse positioning of the heads 118 relative to the selected data track 120 and seek functions of the HSA 110.

In a preferred embodiment dual-stage actuator 110 has a secondary actuator in the form of a piezoelectric transducer-based micro-actuator 130 attached to the load arm 116 (not shown) to provide fine position control of a selected read/write head 118 relative to the corresponding selected data track 120. For the micro-actuator 130 embodiment, the DACs 150 convert and forward positioning and correction signals received from the servo engine 148 to a zero-order hold device 154 (ZOH 154) that continually maintains the positioning signal as a voltage level provided to a summing junction 156 until updated by a subsequent positioning signal issued by the servo engine 148. The summing junction 156 combines the positioning signal received from the ZOH 154 with a bias signal 158 used for setting and maintaining a range of motion of the micro-actuator 130 during operation of the disc drive 100. Incorporation of the bias signal 158 enables the use of a single-sided unipolar driver 160 for driving the micro-actuator 130 during operation of the disc drive 100. The term position-controlling and/or position-control as used herein means, maintaining control of the read/write head 118 relative to the rotating disc surface 106 of disc drive 100 (of FIG. 1) throughout all operations of disc drive 100. In other words, whether positioning the read/write head 118 relative to a selected data track 120 of the rotatable disc surface 106 during track seek operations or maintaining a position of the read/write head relative to the data track 120 during track following operations, the position of the read/write head 118 relative to the rotatable disc surface 106 is under the control of the control circuit 142 through effecting mechanical positions of the HSA 110.

In a preferred embodiment the bias signal 158 is representative of a bias voltage signal, the single-sided unipolar driver 160 is a single-sided unipolar PZT driver 160 and the micro-actuator 130 is a bipolar piezo electric transducer 130 (hereafter PZT 130). The PZT 130 is used for fine position-control of the read/write head 118 relative to the data track 120 and to maintain the mechanical position of the PZT 130 relative to the selected data track 120, based on the voltage level received from the single-sided unipolar PZT driver 160. The single-sided unipolar PZT driver 160 maintains a voltage level used to drive the PZT 130 in the form of a position voltage, until the positioning voltage is updated. Once the position voltage is updated, the single-sided unipolar piezo driver 160 induces a change in mechanical position of the PZT 130, relative to the selected data track 120, which changes the alignment of the selected read/write head 118 relative to the selected data track 120.

Figure 3:
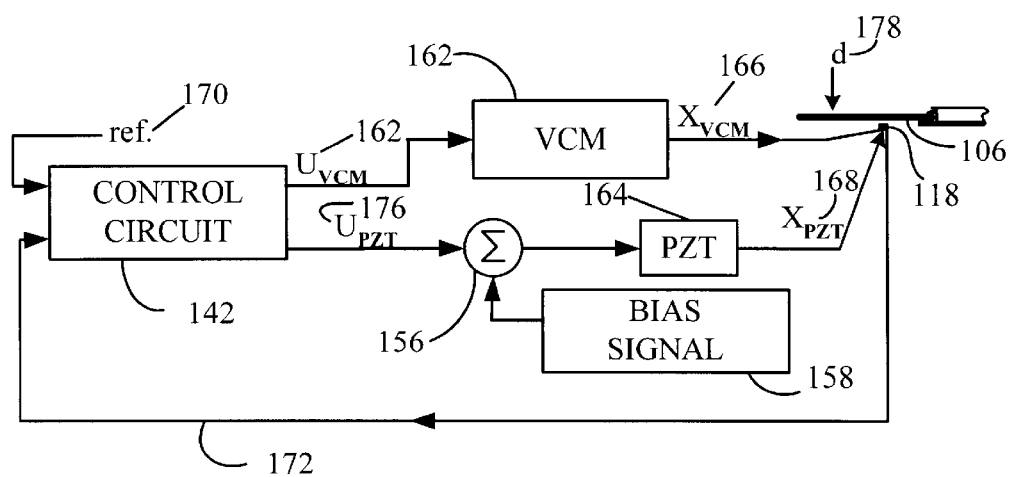
FIG. 3 provides a simplified block diagram of a closed-loop suspension-based dual-stage actuator system of the disc drive of FIG. 1.

FIG. 3 provides a simplified functional block diagram of the servo control loop of FIG. 2. For a preferred embodiment, the single-sided unipolar driver 160, of FIG. 2, is a single-sided unipolar PZT driver 160, the micro-actuator 130, of FIG. 2, is a PZT 130, and the bias signal 158 is a constant output bias signal representative of a constant bias voltage level. Block VCM 162 represents the dynamics of the motor driver circuit 152, of FIG. 2, with the primary actuator motor 122 of the HSA 110, of FIG. 1 acting on the read/write head 118 relative to the disc surface 106. And, block PZT 164 represents the dynamics of the interaction of the single-sided unipolar piezo driver 160(not shown separately) and the PZT 130 (not shown separately) acting on the read/write head 118 relative to the disc surface 106.

The primary actuator, the HSA 110, and secondary actuator, the PZT 130, act in parallel so that the displacements XvCM 166 and XPZT 168 produced by the block VCM 162 and the block PZT 164, respectively, sum to form the total displacement of the selected read/write head 118 relative to the selected data track 120 of the disc surface 106.

The desired position, represented by reference signal 170 (ref.), and the actual position of the selected read/write head 118 relative to the selected data track 120, represented by position signal 172, are fed to the control circuit 142 to produce control signals $U_{VCM}$ 174 and $U_{PZT}$ 176. Control signal $U_{VCM}$ 174 is passed to block VCM 162, while $U_{PZT}$ 176 is passed to the summing junction 156, combined with the constant output bias signal, then passed to the block PZT 164.

Application of the constant output bias signal, represented by bias signal 158, in the form of a bias voltage to the PZT 130 results in the ability to use the single-sided unipolar piezo driver (represented by 160 of FIG. 2) for controlling the PZT 130.

The ability to operate the single-sided unipolar device driver 160 between any two supply voltages, such as minus five volts and plus twelve volts (−5 v and +12 v) or zero and plus twelve volts (0 v and +12 v) or zero and plus five volts (0 v and +5 v) or zero and plus twenty volts (0 v and +20 v) and so on, is contemplated by this disclosure. Additionally, voltage levels expressed in descriptions of preferred embodiments are used for disclosure clarity and are non-limiting. In a preferred embodiment, the single-sided unipolar piezo driver has an output operating range of between zero voltage and a positive forty-five volts (0 v to +45 v), and the PZT 130 has an operating range of between a minus forty volts and a positive forty volts (40 v to +40 v). And, for purposes of brevity and clarity of disclosure, it is to be assumed that a mechanical response of the PZT 130 responding to changes in voltage applied to the PZT 130 is a symmetrically repeatable linear response. In other words, if applying a positive voltage to the PZT 130, such as +20 v, results in an expansion of the PZT 130 in a dimension of the PZT 130 equaling one half (½) of its overall expansion capability along that dimension, then application of a −20 v will cause the PZT 130 to contract along the same dimension, but in the opposite direction of its expansion, an amount equaling one-half (½) of its overall contraction capabilities. And, if the PZT 130 has a maximum capability of expanding to 120% of its dimension along one of its dimensions, it also has the maximum capability of contracting to 80% of its dimension along the same dimension.

Continuing with the example of a preferred embodiment, by supplying the summing junction 156 with the bias signal, representative of a continuous output bias voltage of a positive twenty volts (+20 v), prior to receipt of the position signal 172 by control electronics 142, the single-sided unipolar piezo driver 160 drives the PZT 130 to expand to one-half (½) of its expansion capability. Having the PZT 130 preset at ½ of its expansion capability gives the control electronics 142, the ability to operate with reference signal 170 and position signal 172 to output the control signal UPZT 176 representing a voltage of between negative twenty volts and positive twenty volts (−20 v to +20 v). By combining the control signal UPZT 176, representing a voltage of between (−20 v to +20 v), with the continuous bias signal 158, representing a voltage of +20 v, the summing junction 156 provides, to the single-sided unipolar piezo driver 160, an output signal that is representative of a voltage of between zero volts and plus forty volts (0 v to +40 v). The single-sided unipolar piezo driver 160 in turn drives the PZT 130 with a voltage of between zero volts and plus forty volts (0 v to +40 v). And the PZT 130 responds by reducing its expansion from ½ of its expansion capability to zero expansion, for the case of zero voltage output from the single-sided unipolar piezo driver, or by expanding to 100% of its expansion capabilities for the case of +40 v output from the single-sided unipolar piezo driver. This ability to either expand or contract the mechanical position of the PZT 130 from the preset ½ full expansion capability, through use of a single polarity input voltage, results in the ability to reposition the read/write head 118 either toward or away from the inner diameter of the rotatable disc surface 106. In other words, by biasing the secondary actuator motor (such as 130) of a dual-stage actuator (such as 110), a single-sided unipolar driver (such as 160) can be used to reposition heads (such as 118) of a disc drive (such as 100) relative to a selected track (such as 120), while retaining the current design and functionality of a control circuit (such as 142) of the disc drive.

Also shown by FIG. 3 is a disturbance input represented by force vector d 178, which exemplifies external disturbances such as a vibration or windage from the HSA 110, or disc slippage or disc pack imbalance from the disc pack 108, that act on the system and result in an output disturbance signal (not separately shown) included in the position signal 172. The control system is designed to reject the output disturbance signal by producing motions XvCM 166 and XPZT 168 that counteract the effects of the disturbance force vector "d" 178.

Figure 4:
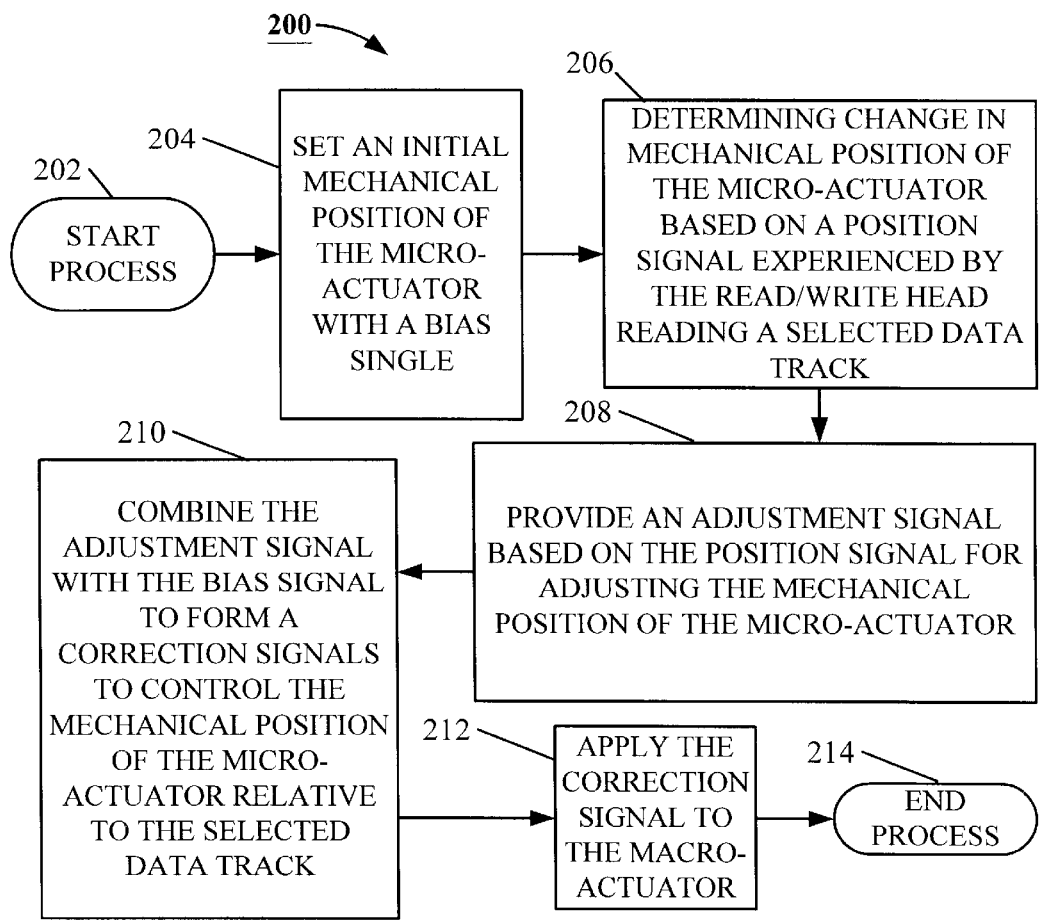
FIG. 4 is a flow chart of a method for controlling the micro-actuator of the disc drive of FIG. 1.

FIG. 4 shows a micro-actuator control process 200 beginning at start process step 202. The micro-actuator control process 200 continues with process step 204 that sets an initial mechanical position of a secondary actuator motor (such as 130) of a dual-stage actuator (such as 110) of a disc drive (such as 100) utilizing a bias signal (such as 158) to preset an initial mechanical position of the secondary actuator motor, and to maintain the initial position of the secondary actuator motor absent a determination, based on a position signal (such as 172), to adjust the position of the secondary actuator motor. By presetting the mechanical position of the secondary actuator motor, with a bias signal, a single-sided unipolar driver (such as 160) can be utilized to facilitate positional adjustments, in both a positive and negative direction relative to the initial preset mechanical position of the secondary actuator motor, while doing so with the single polarity signal.

In a preferred embodiment, the bias signal is a bias-voltage signal. The voltage level of the bias-voltage signal is predetermined empirically by calculating a mean of the displacement responses experienced by each of a representative sample of micro-actuators 130 of a selected PZT material, responding to an application of a known voltage level to each of the representative samples.

In step 206 of the micro-actuator control process 200, the desirability of adjustments of the micro-actuator relative to the selected data track are calculated based on a position signal (such as 172) that includes a displacement signals emanating from disc drive environment disturbances, represented by a force vector (such as 178). If an adjustment in alignment of the selected head relative to the selected data track is determined by the calculations made in step 206 by a control circuit (such as 142), an adjustment signal is generated. In generating an adjustment signal the control circuit compares the position signal to a reference signal (such as 170) to form the adjustment signal capable of adjusting the mechanical position of the secondary actuator motor relative to the selected data track. And, in step 208 the adjustment signal is provided to a summing junction (such as 156) to be combined with the bias signal in step 210 and applied to the secondary actuator motor in step 212 by the single-sided unipolar driver, thereby controlling the mechanical position of the secondary actuator motor.

With the initial mechanical position of the secondary actuator motor set by the bias signal, the changes in mechanical position of the micro-actuator relative to the selected data track calculated, an appropriate adjustment signal generated and combined with the bias signal and then applied to the micro-actuator, the micro-actuator control process 200 ends at step 214.

It is noted, the term micro-actuator or secondary actuator motor, as used herewithin, refers to a device (such as 130) capable of altering mechanical position of a selected head (such as 118) relative to a selected data track (such as 120) independent from or in conjunction with a primary actuator motor (such as 122) to alter mechanical position of the selected head relative to the selected data track. It is also noted that: the driver used to implement the invention need not be a single-sided unipolar driver (such as 160), but may be a dual-sided bipolar driver; the initial mechanical position of the secondary actuator motor need not be half its the expansion capability, but may set anywhere within the range of its capabilities; and the bias signal (such as 158) need not be held at a continuous output level, but may be set to a particular level to accommodate a desired function, such as an ability to expand from full contraction to full expansion to facilitate data collection, manufacturing processing steps or drive operations related to head to disc positioning.

Accordingly, the present invention is directed to an apparatus and method for incorporation of a single-sided unipolar device driver for a piezoelectric transducer in a disc drive. In accordance with one aspect, steps are performed of supplying a bias-voltage signal to the micro-actuator to set an initial mechanical position of the micro-actuator relative to a data track of the disc drive, step 204; generating a position signal indicative of an alignment between the read/write head of the disc drive and data track for use in determining change in mechanical position of the micro-actuator relative to the data track to align the read/write head to the data track, step 206; provided an adjustment signal based on the position signal for use in adjusting mechanical position of the micro-actuator relative to the data track, step 208; combining the adjustment signal with the bias-voltage signal forming a correction signal to correct the mechanical position of the micro-actuator relative to the data track, step 210; and applying a correction signal to the micro-actuator and inducing a predetermined change in mechanical position of the micro-actuator relative to the data track in response to the application of the correction signal, step 212.

The many features and advantages of the present invention are apparent from the written description. It is intended by the appended claims to cover all such features and advantages of the invention. As numerous modifications and changes will readily occur to those skilled in the art, it is not desired to limit the invention to the exact construction and operation as illustrated and described. Hence, all suitable modifications and equivalents may be resorted to as falling within the scope of the invention.

What is claimed is:

1. A method for position-controlling a secondary actuator motor of a dual-stage actuator of a disc drive comprising steps of:

(a) supplying and sustaining a bias signal to the secondary actuator motor during operation of the disc drive to bias the secondary actuator motor to an initial predetermined mechanical position relative to a range of motion of the secondary actuator motor;

(b) generating a position signal indicative of an alignment between a read/write head of the disc drive and the data track for use in determining change in mechanical position of the secondary actuator motor relative to the data track to align the read/write head relative to the data track;

(c) providing an adjustment signal based on the position signal for combination with the bias signal for use in adjusting the mechanical position of the secondary actuator motor relative to the data track;

(d) combining the adjustment signal with the bias signal to form a correction signal used to control the mechanical position of the secondary actuator motor relative to the data track; and (e) applying the correction signal to the secondary actuator motor to induce a predetermined change in mechanical position of the secondary actuator motor relative to the data track, thereby position-controlling the secondary actuator motor relative to the data track.

2. The method of claim 1 in which the supplying step (a) comprises steps of:

(a1) selecting a predetermined bias voltage level based on a mean displacement response of a plurality of selected secondary actuator motors to an application of a known voltage value to each of the plurality of the selected actuator motors; and (a2) applying the selected bias voltage level to the secondary actuator motor throughout operation of the disc drive.

3. The method of claim 1 in which the combining step (d) comprises steps of:

(d1) receiving the adjustment signal as an output of a control circuit of the disc drive into a summing junction of the disc drive;

(d2) combining the adjustment signal and the bias signal with the summing junction to form the correction signal; and (d3) transferring the correction signal to a single-sided unipolar device driver of the disc drive for application to the secondary actuator motor.

4. The method of claim 1 in which the bias signal of supplying step (a) is representative of a positive voltage and the secondary actuator motor is a piezoelectric transducer.

5. A disc drive comprising:

a disc pack supporting an axially aligned rotatable disc surface having a plurality of adjacent data tracks;

a dual stage actuator with an actuator arm and a primary actuator motor support comprising: a read/write head positionably adjacent the rotatable disc surface for writing data to and reading data from the rotatable disc surface; a primary actuator motor supported by the primary actuator motor support providing coarse placement of the read/write head relative to the rotatable disc surface; and a micro-actuator motor supported by the actuator arm providing fine position control of the read/write head relative to a selected one of the plurality of adjacent data tracks; and a control circuit comprising a signal continually biasing the micro-actuator motor to an initial predetermined mechanical position relative to the selected one of the plurality of adjacent data tracks of the disc drive.

6. The disc drive of claim 5 in which the micro-actuator motor is a piezoelectric transducer.

7. The disc drive of claim 5 in which the signal is a bias signal representative of a bias voltage and the control circuit further comprises:

a preamplifier communicating with the read/write head for reading a position signal from a selected one of the plurality of adjacent data tracks;

a servo engine communicating with the preamplifier for calculating an adjustment signal based on the position signal, the adjustment signal representative of an adjustment voltage;

a summing junction combining the bias signal and the adjustment signal to form a correction signal representative of a correction voltage used for changing mechanical position of the micro-actuator motor relative to the selected one of the plurality of adjacent data tracks; and a single-sided unipolar device driver communicating with the summing junction for applying the correction signal to the micro-actuator motor to induce a predetermined change in the mechanical position of the micro-actuator motor relative to a selected one of the plurality of adjacent data tracks.

8. The disc drive of claim 7 in which the micro-actuator motor is a piezoelectric transducer.

9. A disc drive comprising:

a disc pack supporting a rotatable disc surface having a plurality of data tracks for storing data; and an actuator with an actuator arm supported by a bearing assembly comprising: a read/write head supported by the actuator arm and rotationally positionably adjacent the rotatable disc surface for writing data to and reading data from a selected one of the plurality of data tracks; and a micro-actuator with a range of motion supported by the actuator arm for position-controlling the read/write head relative to the selected one of the plurality of data tracks by steps for position-controlling the micro actuator relative to the selected one of the plurality of data tracks.

10. The disc drive of claim 9 in which the disc drive further comprising a control circuit with a signal for setting and maintaining a range of motion of the micro-actuator during operation of the disc drive.

11. The disc drive of claim 9 in which the micro-actuator is a piezoelectric transducer.

12. The disc drive of claim 10 in which the signal is a bias signal representative of a bias voltage and the control circuit further comprising:

a preamplifier communicating with the read/write head for reading a position signal from a selected one of the plurality of adjacent data tracks;

a servo engine communicating with the preamplifier for calculating an adjustment signal based on the position signal, the adjustment signal representative of an adjustment voltage;

a summing junction combining the bias signal and the adjustment signal to form a correction signal representative of a correction voltage used for changing mechanical position of the micro-actuator relative to the selected one of the plurality of adjacent data tracks; and a single-sided unipolar device driver communicating with the summing junction for applying the correction signal to the micro-actuator to induce a predetermined change in the mechanical position of the micro-actuator relative to selected one of the plurality of adjacent data tracks, thereby position-controlling the read/write head relative to the selected one of the plurality of data tracks.

13. The disc drive of claim 12 in which the micro-actuator is a piezoelectric transducer.

14. The disc drive of claim 12 in which the actuator is a dual-stage actuator comprising:

a primary actuator motor for providing coarse position control of the read/write heads adjacent the selected one of the plurality of data tracks; and a primary actuator motor support supporting a primary actuator motor for providing rotation of the actuator arm to achieve the coarse position-control of the read/write heads adjacent the selected one of the plurality of data tracks; and wherein the servo engine provides a control signal for application to the micro-actuator to facilitate fine position control of the read/write heads adjacent the selected one of the plurality of data tracks, and a control signal for application to the primary actuator motor to facilitate coarse position-control of the read/write head relative to the disc surface.

15. The disc drive of claim 9 in which the steps for position-controlling the micro-actuator relative to the selected one of the plurality of data tracks comprise steps of:

(a) supplying and sustaining a bias signal to the micro-actuator during operation of the disc drive to bias the micro-actuator to an initial predetermined mechanical position relative to a data track of the disc drive;

(b) generating a position signal indicative of an alignment between a read/write head of the disc drive and the data track for use in determining change in mechanical position of the micro-actuator relative to the data track to align the read/write head relative to the data track;

(c) providing an adjustment signal based on the position signal for combination with the bias signal for use in adjusting the mechanical position of the micro-actuator relative to the data track;

(d) combining the adjustment signal with the bias signal to form a correction signal used to control the mechanical position of the micro-actuator relative to the data track; and (e) applying the correction signal to the micro-actuator to induce a predetermined change in mechanical position of the micro-actuator relative to the data track, thereby position-controlling the read/write head relative to the selected one of the plurality of data tracks.

16. The disc drive of claim 15 in which the supplying step (a) comprises steps of:

(a1) selecting a predetermined bias voltage level based on a mean displacement response of a plurality of selected micro actuators to an application of a known voltage value to each of the plurality of the selected actuator motors; and (a2) applying the selected bias voltage level to the micro actuator throughout operation of the disc drive.

17. The disc drive of claim 15 in which the combining step (d) comprises steps of:

(d1) receiving the adjustment signal as an output of a control circuit of the disc drive into a summing junction of the disc drive, the adjustment signal representative of an adjustment voltage to be applied to the micro-actuator;

(d2) combining the adjustment signal in the bias signal with the summing junction to form the correction signal, the correction signal representative of a correction voltage applied to the micro-actuator to facilitate alignment of the read/write head relative to the selected one of the plurality of data tracks; and (d3) transferring the correction signal to a single-sided unipolar device driver of the disc drive for application as the correction voltage to the micro-actuator.

* * * * *